(12) United States Patent
Yim et al.

(10) Patent No.: US 8,468,313 B2
(45) Date of Patent: Jun. 18, 2013

(54) ASYNCHRONOUS REPLICATION WITH WRITE CONCURRENCY GROUPING

(75) Inventors: Wai C. Yim, Merrimack, NH (US); Charles Binford, Wichita, KS (US)

(73) Assignee: Oracle America, Inc., Redwood City, CA (US)

( * ) Notice: Subject to any disclaimer, the term of this patent is extended or adjusted under 35 U.S.C. 154(b) by 1802 days.

(21) Appl. No.: 11/457,633

(22) Filed: Jul. 14, 2006

(65) Prior Publication Data
US 2008/0016300 A1 Jan. 17, 2008

(51) Int. Cl.
*G06F 12/00* (2006.01)

(52) U.S. Cl.
USPC .................................. 711/162; 711/E12.103

(58) Field of Classification Search
USPC .................................................. 711/E12.103
See application file for complete search history.

(56) References Cited

U.S. PATENT DOCUMENTS

| | | | | |
|---|---|---|---|---|
| 5,592,618 | A * | 1/1997 | Micka et al. ................ | 714/54 |
| 5,893,140 | A | 4/1999 | Vahalia et al. | |
| 6,301,643 | B1 * | 10/2001 | Crockett et al. ............. | 711/162 |
| 6,493,809 | B1 | 12/2002 | Safranek et al. | |
| 2005/0050286 | A1 | 3/2005 | Crowley et al. | |
| 2005/0091391 | A1 | 4/2005 | Burton et al. | |
| 2005/0210078 | A1 | 9/2005 | Maruyama et al. | |
| 2006/0026460 | A1 | 2/2006 | Goldberg et al. | |

OTHER PUBLICATIONS

Veritas Software Corporation, Global Availability for Oracle, Jun. 2002.
Sandeep D. Ranade, Asynchronous Replication, Linux Journal, Jan. 28, 2004.

* cited by examiner

*Primary Examiner* — Larry Mackall
(74) *Attorney, Agent, or Firm* — Marsh Fischmann & Breyfogle, LLP; Kent A. Lembke; Bobby B. Soltani

(57) ABSTRACT

A method for controlling write order in a remote data storage system used for asynchronous replication. The data backup method includes receiving writes issued concurrently by a host prior to any being completed. An async write manager, such as a software application on a storage controller or on a host, operates to group each of the writes into a concurrency group with a replica write corresponding to each of the host writes being queued for transmittal over a link to a remote data storage system. The replica writes each include a concurrency group identifier, such as a group number or last completed write number, that identifies which concurrency group the replica has been assigned. The method includes transferring the replica writes to the remote data storage system and processing the concurrency group identifiers with a write order manager to determine which subsets of the replica writes to issue concurrently.

13 Claims, 3 Drawing Sheets

ASYNCHRONOUS REPLICATION WITH WRITE CONCURRENCY GROUPING

BACKGROUND OF THE INVENTION

1. Field of the Invention

The present invention relates, in general, to data storage and back-up solutions that allow recovery of replicated data, and, more particularly, to software, hardware, and computer systems for providing improved write order control in a data storage system that implements asynchronous replication to provide data protection for a host or primary site with data targets located at a remote or secondary site.

2. Relevant Background

In the data storage industries, the need for effective and reliable backup and archiving of data or information is well known and is becoming increasingly important. The term "backup" generally means that a backup copy of data written to a host or an applications data volume (e.g., writes or changes to the previously stored data) are copied to a remote or secondary site to allow recovery of the data in the case of a failure of the data stored at the host or primary site. This backup operation usually involves a transfer of data to disk storage over a digital communications network, such as to a redundant array of inexpensive disks (RAID) system, and/or to magnetic tape. If the storage resource is thereafter lost or becomes unavailable on account of equipment failure, or for any other reason (e.g., a virus strikes or a personnel error causes a crash), it is then possible to use the backup data to reconstruct the state of the information in host or primary storage.

More specifically, enterprise applications such as file system and database applications often handle large quantities of data, and it is important that the storage of this data be handled and managed such that it can be reliably recovered if a failure causes a crash of the application or a primary data storage device. Data recovery programs or applications are often provided that make the applications and the data storage system crash tolerant. To support such data recovery applications or algorithms, changes to the application data needs to be written in a well-defined order, which may be controlled by the enterprise or host application. If replication is deployed to a remote or secondary site, any changes to the replica or target data or volume needs to be applied in the same order as was done at the host or primary site. Then, the application can reliably recover the data from the replica or copy. If order is not preserved, then data integrity may be compromised and problems or data corruption may occur during attempts to use the inconsistent data. Further, it should be understood that application writes have well defined sequences. For instance, a file system often completes meta data updates before the data is written. Database writes the data and then issues writes to commit. This serialization and parallelism of writes must be maintained to ensure the resulting data pattern on the secondary or remote site is proper. Synchronous replication ensures the write order is maintained by the requesting application as each write is completed at both the primary and secondary site as it is requested. The application cannot proceed to the next write until it has received a write acknowledgement from both sites. However, synchronous replication often results in delays and application inefficiencies due to transfer of data over the network to the remote, secondary site.

Asynchronous replication was introduced to meet the need for longer distance replication at secondary sites that addressed network latencies and allowed the application or host to operate at the speed of local data storage. Asynchronous replication decouples the write to the remote site from the write to the primary site (e.g., to a volume(s) in a local data storage device or to local disk devices), which allows the enterprise or primary application to function at local write speeds. Changes are then picked up from a local queue and asynchronously written to a target at a remote site. In this configuration, the application is able to perform as if replication was not in use, but the problem is that the state of the target or replica of the application data lags behind by one or more writes depending upon the write volume, network latency, and other variables. Decoupling of the source and back up write, therefore, creates the problem that without further control or replication management the write ordering at the remote site is not automatically preserved, which makes recovery problematic.

Typically, write order is preserved in data storage systems that implement asynchronous replication by using serialization at the remote site. For example, in asynchronous replication mode, host or application writes at a primary or host site are issued locally to a data volume in local data storage devices and to an asynchronous ("async") log or local queue concurrently or in parallel. Host writes are completed to the host only after both of these local writes are completed. Serialization then attempts to preserve the write order on the remote site by requiring that the content of the async log be written at the remote site in the order it was written. Serialization systems have tried to address latency issues, and in some systems, network or link latency is addressed by sending these logged or queued writes to the remote site via the network or link in parallel rather than in order or serially. Then, to guarantee proper write ordering at the remote site, the received and remotely queued writes are issued serially to target volumes or to replicas of the host or enterprise application data. In order to be certain about this ordering, in other words, only one write can be issued at the remote site at a time. As would be expected, when writes are issued serially, performance at the target or remote site may be significantly limited. This is especially true if the remote volume is complex such as being made up of multiple arrays or if there are contentions in the underlying storage array. Serialization at the remote site controls write ordering but results in ongoing lags or delays in updating of replicas, and this causes the replica or copy of application data to have a differing state (i.e., to not reflect all changes to the primary data) that may cause excessive data build up at the primary async log possibly unnecessarily exceeding the capacity.

As a result, existing methods of controlling write order in data storage systems that implement asynchronous replication do not meet the needs of enterprises and others. There is a need for improved techniques of managing writes at primary and secondary sites (or host and remote sites) to control write ordering while better controlling latency between writes at a primary site and a secondary site. Preferably, such techniques would have lower latencies or delays than are presently provided by storage methods that use serialization at the remote site.

SUMMARY OF THE INVENTION

The present invention addresses the above problems by providing a method (and corresponding software and hardware components) for controlling write order at a secondary or remote site. The method is particularly suited to use in data storage systems that use asynchronous replication to generate backup data or volumes at the remote site. Briefly, the method involves stamping host writes with concurrency group identifiers prior to storing or writing the host writes (or replica writes) to a queue, i.e., in an asynchronous or async log, for later serial and/or parallel transfer over a link to the remote storage. At the remote storage, the concurrency group identifiers are used to select subsets of the received replica writes for parallel or concurrent issuing to target volumes. In other words, write control is achieved at the remote site by using the same concurrency groups as used at the primary or host site by the host application(s).

More particularly, a method is provided for ordering writes in a remote data storage system. The method includes receiving host writes to a volume in a first data storage resource. An async write manager, such as a software module on a storage controller or on the host server, operates to group each of the writes into a concurrency group with a replica write corresponding to each of the host writes being queued for transmittal over a link to a remote data storage system. The replica writes each include a concurrency group identifier that identifies or defines which concurrency group the replica has been assigned to by the async write manager. The method further includes transferring the replica writes to the remote data storage system and then processing the concurrency group identifiers with a write order manager to determine which should be issued in parallel at the remote site or data storage system. The write order manager then issues a subset of the replica writes concurrently to a target volume on a second data storage resource based on the concurrency group identifiers.

In one embodiment, the concurrency group identifiers include a concurrency group number that is assigned by the async write manager, with the number being incremented or decremented when one of the writes associated with the number (i.e., in the concurrency group) completes at the first data storage resource. The write order manager selects replica writes for concurrent issuance that have the same concurrency group number and works through these groups or subsets of replica writes sequentially issuing the replica writes in each group concurrently (or at least partially concurrently). In another embodiment, the concurrency group identifiers each include a sequence number of the last one of the writes that was completed to the first data storage resource. A single sequence number is used by the async write manager for stamping the replica writes until a host write with a sequence number greater than present last sequence number completes at the first data storage resource, and at this point, this new sequence number is assigned or stamped to each replica write until a later write completes (i.e., one with a larger or later sequence number completes). Using either of these techniques, write order of the second data storage resource at the remote data storage system is the same as the host writes issued to the first or local data storage resource.

DETAILED DESCRIPTION OF THE PREFERRED EMBODIMENTS

Figure 1:
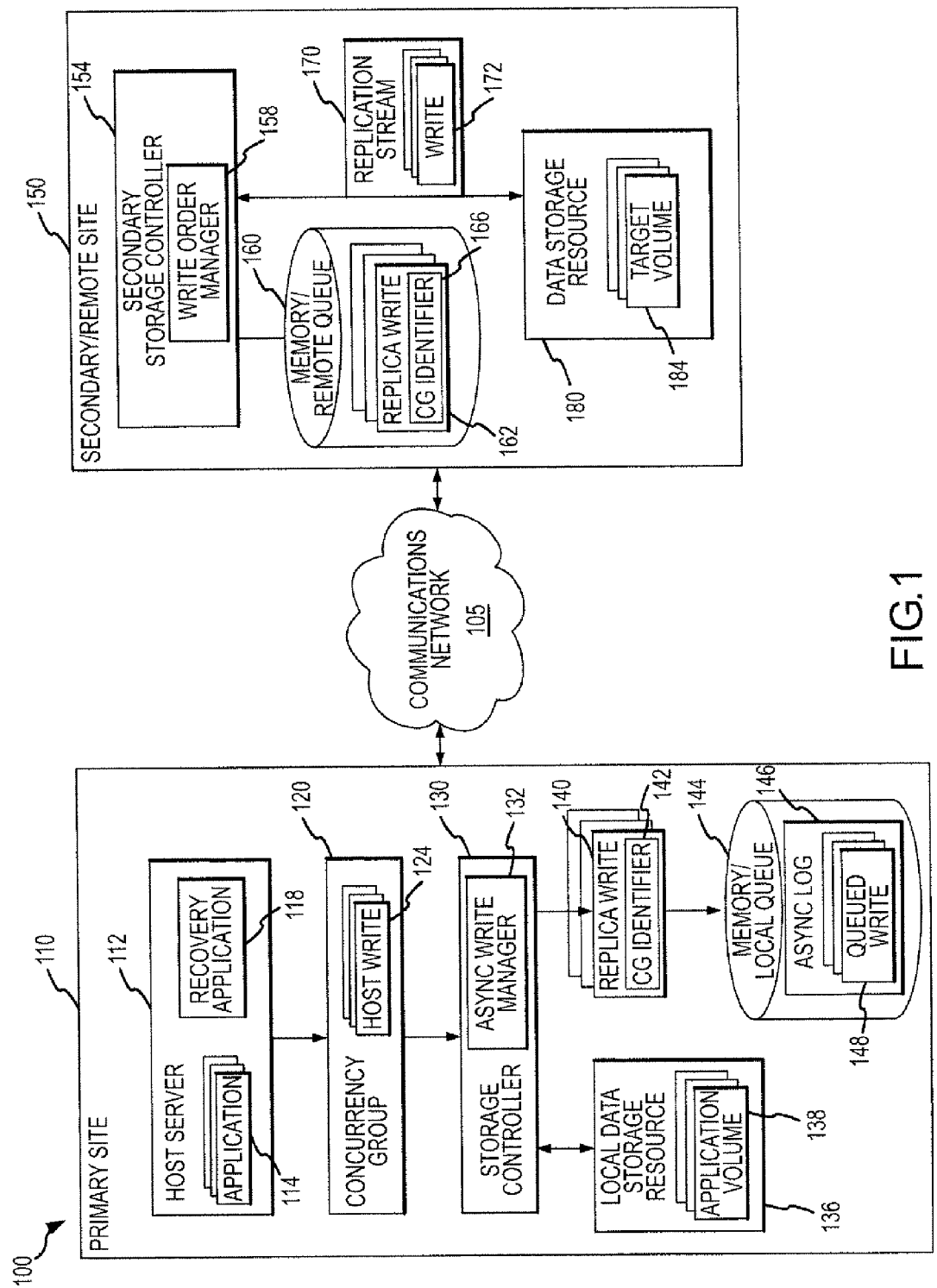
FIG. 1 illustrates in block diagram form a data storage system that implements asynchronous replication with write order control according to one embodiment of the invention.

The present invention is directed to methods and systems for providing write order control or management, e.g., write ordering that is consistent at a primary or host site and at a secondary or remote site that is used to store backup copies of data such as application data. The methods and systems of the invention are particularly suited for providing write order in data storage systems that utilize asynchronous replication to create backups in the secondary site in target volumes. As will be explained, the inventive methods and systems use write concurrency grouping or groups to provide writes at the secondary site that have the same combinations of possible states that a set of concurrent writes can produce on the primary site with reduced lags or delays in performing such backup writes such that the target or backup volumes better replicate those on the primary site or system.

In asynchronous replication, application writes, such as writes for an application running on a host server, are written locally and into an asynchronous or "async" queue. Over time, the data is replicated over a link or network to a remote site. In this process, it is important to maintain the write ordering as issued by the application in order to preserve the assumptions made by the application in case of interruptions and recoveries. Specifically, in asynchronous replication mode, host writes are issued locally to a data volume and to an async log in parallel. Host writes are completed to the host only after both writes are completed. To preserve write ordering on a remote site used for backing up the host or primary site or system, the content of the async log preferably is written at the remote site in the order it was written at the primary site. To minimize the impact of link latency, more than one write are preferably sent in parallel to the remote site. To control write ordering in asynchronous operating mode at the remote site, prior data storage systems typically issued writes received at the remote site in a serial manner or serially, which resulted in only one write being issued at a time at the remote site and creating a bottleneck or significant reduction in backup write efficiency. When writes are issued serially, performance at the remote or secondary site can be seriously limited, and this is especially true when the remote or target volume is made up of multiple arrays or if there are contentions in the underlying storage array.

The concurrency of writes that can occur on the remote site is the same concurrency as provided at the primary site as issued by the host. A feature of the methods and systems described herein is to reflect this host concurrency in the replication stream so that it can be used at the remote site when issuing writes (e.g., backing up writes in a target volume). This is achieved by "write concurrency grouping" as is explained in detail below. Concurrency is generally defined by writes that are issued together by the host or host application before any are completed. This concurrency is abstracted according to the inventors as a concurrency group and recorded in the replication stream along with the sequence number used to guarantee or control write ordering. With the addition of this concurrency group information, writes that are marked as concurrent can be issued in parallel at the remote site. This allows the writes on the remote site to achieve or at least approximate the concurrency at the primary or host site. With this increased concurrency on the remote site, the general bandwidth of backup data storage is improved along with better utilization of the storage subsystem or resources on the remote site. Such improvements are particularly realized for consistency groups where multiple volumes share a single async log. The inventive methods and systems described also allow replicated writes to better compete for bandwidth and I/O processes of the storage at the remote site when the storage is shared among replication and other applications.

To practice the invention, the computer, network, and data storage devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated wired or wirelessly in digital format following standard communication and transfer protocols. The data storage resources are generally described as disk devices that implement standard storage techniques such as RAID or the like and that may use SCSI and other I/O, data transfer, and storage protocols but the invention is not intended to be limited to the exemplary embodiments shown herein as it is useful for nearly any data storage arrangement in which data volumes are generated and maintained and are written to by write operations (as will be clear to those skilled in the art). The storage controllers described herein may take many forms such as a RAID processor or more generally as storage processors useful for performing the functions describe herein. Further, the description typically shows devices such as the storage controllers, associated memory, and/or queues or caches as having a location (such as within a single housing or box or host/remote system or site) but the physical location is not limiting with the functionality of the components and their ability to communicate being the more important aspects. The terms "site" and "system" may be used interchangeably as meaning a computer system located at one or more physical locations.

FIG. 1 illustrates a relatively simple data storage system 100 in which the concurrency grouping techniques of the present invention may be implemented. To this end, the system 100 includes a primary or host site 110 (or computer system or network) that is linked by wire or wirelessly or in communication with a secondary or remote site 150 (or computer system or network). The secondary site 150 is used to provide a remote backup storage resource for the primary site 110 and its applications 114. Particularly, the system 100 is operated at least part of the time in asynchronous replication mode with implementation of write concurrency grouping according to the invention to control write order on the secondary site.

The system 100 is shown in simplified form and in practice may be much more complex. As shown, the primary site 110 includes a host or host server 112 that runs one or more applications 114 that perform operations on data or application volumes including host writes that change the data in memory and for which backups are required or at least preferred to allow recovery. In this regard, the host server 112 also runs a recover[y] application 118, which may be a part of the application 114 or be provided by a separate system (not shown). The recovery application 118 is configured to use data storage in target volumes 184 in data storage resources 180 (such as disk drives or the like) of the secondary site 150 to recreate or recover the application volumes 138 when this data is lost or corrupted or the like. To allow such recovery to be completed accurately, the target volume 184 preferably is changed or written to in the same order as the local storage 136.

During operation of the primary site 110, the application 114 may issue one or more host writes 124 that may be issued as a group or with concurrency such that the writes are issued by the host 112 prior to any being completed. According to the invention, the storage controller 130 runs an async write manager 132 that abstracts these concurrent host writes 124 into a concurrency group 120. Replica writes 140 with an identifier of their concurrency group 142 are written to a local memory or async queue/cache 144 as shown with an async log 146 with queued writes 148. In parallel, the host writes 124 are issued via the storage controller 130 to the local data storage resource 136 and volume(s) 138. Upon completion of the host writes locally on the primary site 110, the storage controller 130 transmits the replica writes 162 with concurrency group identifiers 166 to the secondary site 150, which uses these writes 162 to form a backup in target volumes 184 that reflect these host writes 124. The writes 162 may be transmitted over the network 105 and received in parallel, which forces the remote site 150 to perform some actions to control write order.

As shown, the secondary site 150 includes a secondary storage controller 154 with a write order manager 158 that functions to order the writes 172 in a replication stream 170 that it sends or issues to a data storage resource 180 in target volumes 184. The storage controller 154 stores the received writes 162 in a memory or queue 160 prior to issuing writes in stream 170 to resource 180. As is explained below, the write order manager 158 processes the replica writes 162 to first determine whether the write is marked as part of concurrency group by an identifier 166 and if so processes the replica writes 162 to allow the stream 170 to include two or more writes 172 that can be issued in parallel or concurrently as was done at the primary site with host writes 124 in concurrency group 120. In this manner, the replication stream 170 at the remote site 150 is not congested by using only serial writes (although some of the writes 172 may be issued serially such as when not part of a concurrency group or as part of a later concurrency group relative to an earlier concurrency group).

According to one embodiment of the invention, concurrency grouping is provided by using concurrency group numbers in the concurrency group identifier, e.g., the CC identifier provided by the async write manager includes a concurrency group number along with the sequence number. This embodiment can be seen in FIG. 2, which is a partial view of a data storage system 200 (such as a subset of system 100 of FIG. 1) shown to include a primary site 110 linked via network 105 to a secondary site 150. The primary site 110 includes a plurality of replica writes 240 with concurrency group (CG) identifiers 242 according to this embodiment of the invention such as may be generated by an async write manager 130 that may be provided in a storage controller 130 or as part of the host server 112. As shown, each host write 240 that is in a concurrency group is tagged with a CG identifier 242 that includes a sequence number 246 and also a concurrency group number (or other identifier to link the write to a particular concurrency group).

The replica writes 240 are transmitted in parallel and/or serially over network 105 to the secondary site 150 for temporary storage in queue 160. A queue 160 is provided on the secondary site 150 for storing the received replica writes 240 with their CG identifiers 242. The write order manager 158 processes these received and queued writes using the sequence number 246 and concurrency group number 248 to determine which ones may be issued as concurrent replica writes 250 to the target volume(s) 184 on the remote data storage resource 180. Briefly, the write order manager 158 transmits writes concurrently 250 when they have equal concurrency group numbers (or identifiers) but, of course, differing sequence numbers. In this manner, the concurrency used by the host at the primary site is maintained and used to increase the performance of data backup at the secondary site 150 while controlling write order so as to have the target volume 184 coincide with the corresponding host or local volume at the primary site 110.

In this embodiment, the write concurrency grouping is reflected or indicated in the CG identifier 242 provided as part of each replica write 240 by including a concurrency group number 248 along with a sequence number 246. In this approach, all writes that are received together by a storage controller on the primary site 110 are stamped or tagged with a particular concurrency group number (or other identifying symbol) 248. This number 248 is then incremented by the storage controller, such as by the async write manager 132 in FIG. 1, when any of the writes in the group is completed to the host. The next batch of writes 240 are stamped or tagged with a next higher (or lower) group number by the async write manager 132 and this process is repeated to control write order during asynchronous replication in system 200. On the remote site 150, any I/Os or replica writes 250 that have the same concurrency group number 248 can be issued in parallel to the target volume 184, as determined by the write order manager 158 inspecting the CG identifiers 242 of received writes in queue 160. Any I/Os or writes with differing (i.e., higher or lower) concurrency group numbers 248 are held in the queue 160 by the write order manager until all previous I/Os or replica writes 240 with differing (e.g., lower) numbers are completed. Then, the received writes in the next concurrency group may be issued at the secondary site 150.

Figure 3:
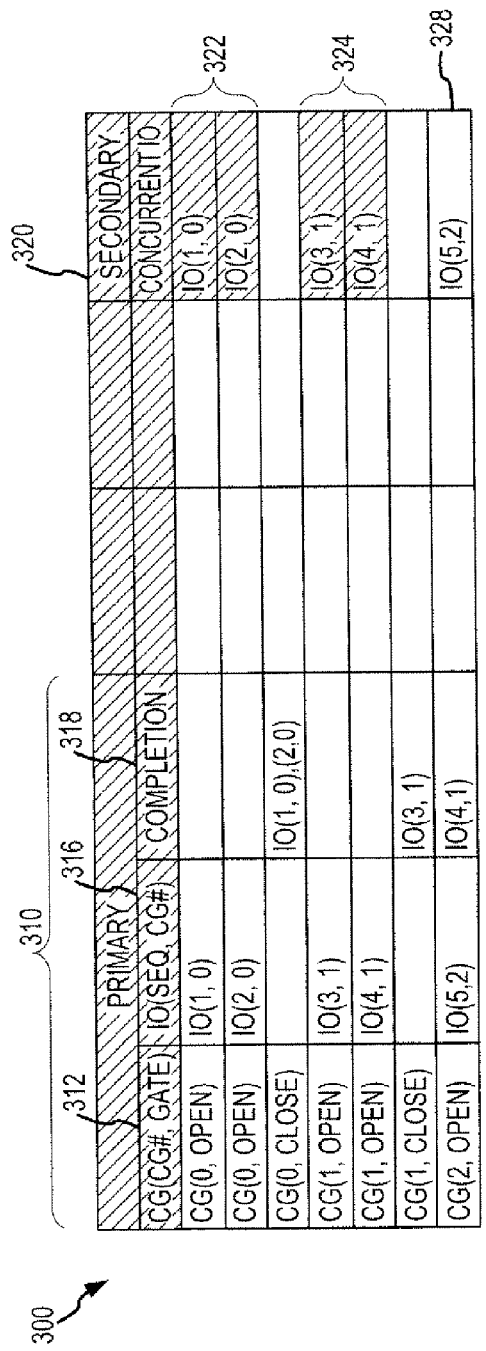
FIG. 3 illustrates operation of the system of FIGS. 1 and 2 in tabular form.

A simple example of such write order management is shown in tabular form in table 300 of FIG. 3. As shown, write activity at the primary site is shown at 310 and at the secondary site at 320. At the primary site, I/Os or host writes are shown in column 316 with column 312 indicating the grouping or abstraction performed by the async write manager to place these I/Os into concurrency groups. Column 318 shows the completion of certain I/Os, which signals to the async write manager that a new concurrency group should be started (i.e., the concurrency group number should be incremented). Column 320 shows the issuing of 3 sets of concurrent I/O or replica writes by the write order manager 158 in the secondary site 150. These concurrent groups or sets of writes are issued in parallel as shown at 322, 324, and 328 and as shown in the table 300, these parallel writes are the same as those issued on the primary site, which results in write order being better or more accurately controlled in this embodiment of the invention.

In the illustrated example, I/Os with sequence numbers 1 and 2 can be executed remotely concurrently as shown at 322 because they were issued on the host Or primary site concurrently, with this host concurrency shown by the concurrency group number being "0", or the same for both writes or I/Os. Once either of I/O or host writes having sequence 1 or 2 completes, new or additional I/Os or host writes must use a different concurrency group number as is shown for I/O 3, 4, and 5. The table 300 is shown as closing the concurrency group "0" upon completion of one or both these first two host writes. This signals that secondary site and its write order manager 158 to wait until I/O are completed before issuing I/O or replica write having a sequence number of "3" because this replica write has a different concurrency group number (which indicates it was not issued concurrently on the primary). In some embodiments, the concurrency group numbers are incremented and in some cases these numbers are decremented. In some cases, different symbols such as alphabetic letters are used instead of numbers. Also, in some embodiments, the async write manager 132 maintains some or all of the information shown in table 300 in memory for use in determining which concurrency group number to assign to later issued I/Os or host writes, and similarly, the write order manager may store some of the data shown in column 320 in memory as necessary to perform its functions of selecting replica writes for concurrent issuance on the secondary site.

Figure 2:
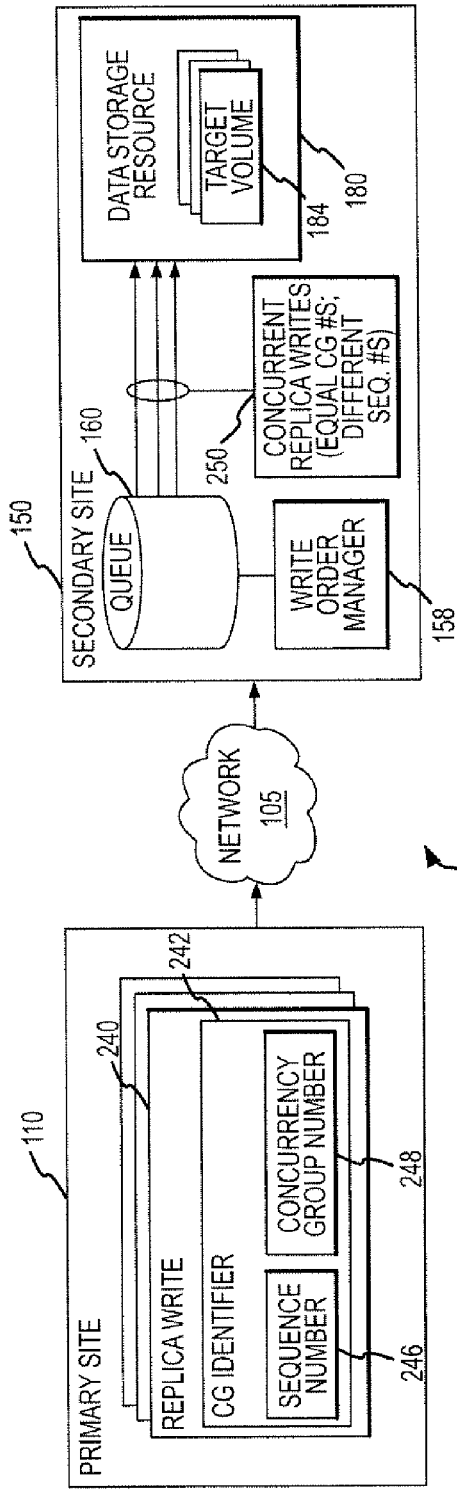
FIG. 2 illustrates in block diagram form one embodiment of a replication method of the invention that involves transmittal of replica writes with concurrency group identifiers to a remote or secondary site for storage on a data target or target volume using concurrency grouping to control write order.
Figure 4:
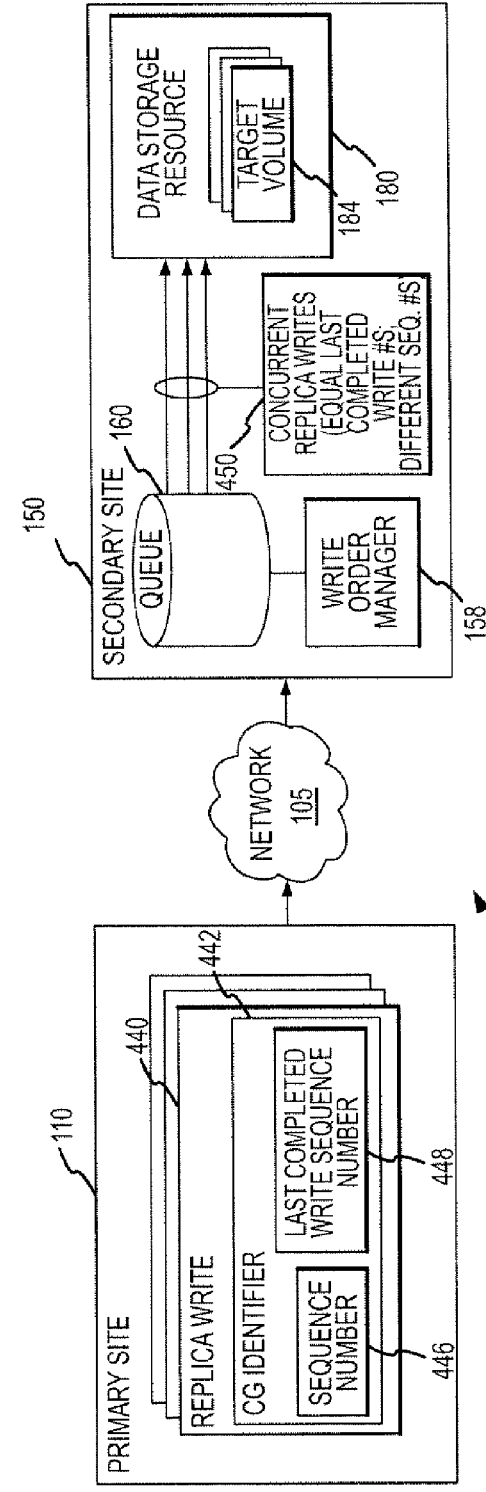
FIG. 4 illustrates in block diagram form another embodiment of a replication method of the invention that is similar to the method of FIG. 2 but uses a concurrency window concept to provide a concurrency group identifier to replica writes to control write ordering.
Figure 5:
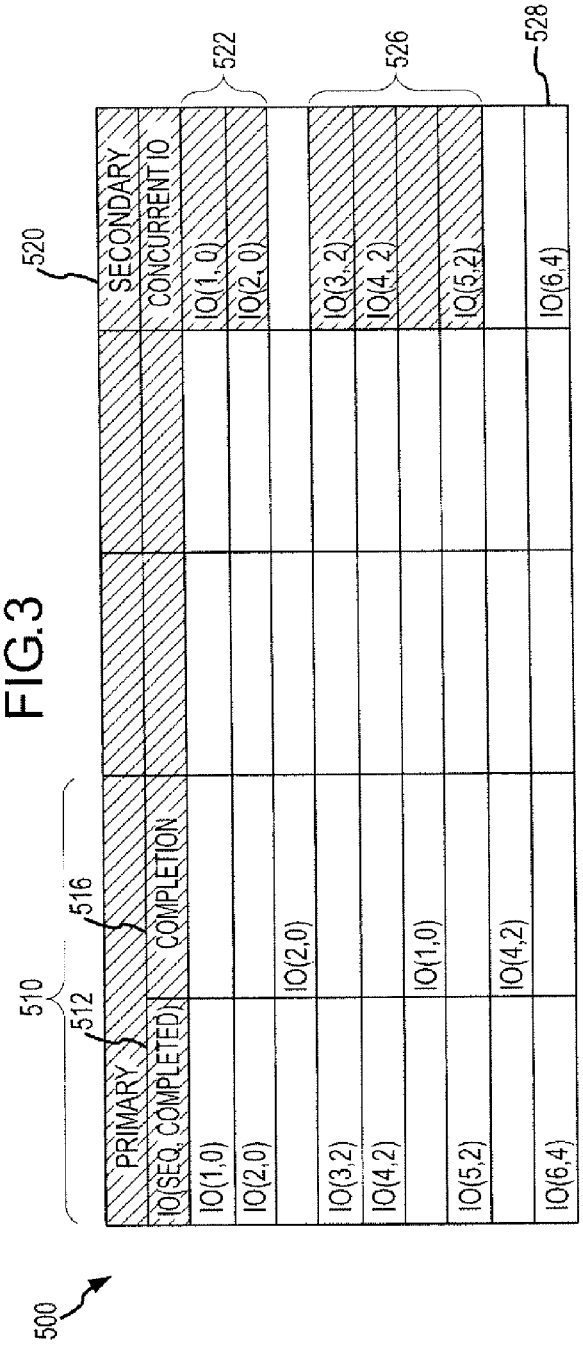
FIG. 5 illustrates operation of the system of FIGS. 1 and 4 in tabular form.

FIGS. 4 and 5 illustrate another embodiment of a storage system 400 similar to the partial data storage system shown in FIG. 2. In this system 400, the primary site 110 is adapted, such as with an async write manager 132, that acts to generate or tag replica writes 440 with CG identifiers 442 that include a sequence number for the I/O and also include a last completed write sequence number 448 that defines which concurrency group the replica write 440 belongs to. The replication stream or groups of replica writes 440 are transmitted over network 105 to secondary site 150 where they are stored temporarily in queue prior to issuing to target volumes 184 of a remote data storage resource 180. The write order manager 158 processes the CG identifiers 442 of each write to determine the sequence numbers 446 and last completed write sequence number 448. This information is used to select subsets of the queued replica writes to issue as concurrent replica writes 450 to the target volume 184, and this concurrency or write order is the same as issued by the host on the primary site 110.

In other words, another technique of reflecting concurrency by an async write manager is to embed the last completed sequence number on the primary in the write stream. This allows the concurrency "window" to stay open as long as possible on a per write basis. In this model, the sequence number of the last completed write on the primary site is sent along with every replica write in its CG identifier (i.e., as number 448). By examining the last completed write sequence number 448, the write order manager 158 on the secondary site 150 can control queued writes by only making each write wait for the same last completed write as was seen or experienced on the primary site 110. This preserves write ordering.

The table 500 of FIG. 5 illustrates operation of the system 400 to manage write order at a secondary or remote site 150. Activities at the primary site are shown at 510 with column 512 showing issued I/Os or replica writes tagged with CG identifiers that include the sequence and the last write sequence number completed. Column 516 indicates host write completion and its effect on the replica writes of column 512. Activities occurring at the secondary site are shown in column 520 with concurrent replica writes issued by write order manager 158 shown at 522, 526, and 528. As shown in this simple example, I/Os (or host writes) 1 and 2 are issued concurrently on the primary site, and both of these I/Os have a last completed write sequence number (i.e., "0"). This information is provided with the replica writes transferred to the queue 160 on the secondary site 150 and the write order manager 158 acts to issue these I/Os concurrently based on their same last completed write sequence numbers 448. As soon as I/O 2 completes on the primary site 110, subsequent I/Os that are transmitted to the secondary site 150 must wait for I/O 2 and all previous (as shown by their sequence number value) to complete. This is achieved by setting the last completed write sequence number to "2" in subsequent I/Os (i.e., in I/Os or writes 3, 4, and 5), and this tagging is performed by the async write manager of the primary site 110. Note, when I/O 1 completes after I/O 2, this does not change the last completed sequence number of later issued I/Os because the write order manager 158 on the secondary site 150 is configured to ensure that all I/Os previous to I/O 2 (i.e., the concurrent replica writes in the current concurrency group being written to remote data storage resource on the secondary) must complete before additional I/Os are issued to the target volumes 184.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for ordering writes in a remote data storage system such that the ordering of the writes is preserved in the remote data storage system, the method comprising:
receiving a plurality of writes to a volume in a first data storage resource;
operating a write manager to group each of the writes into one of a plurality of concurrency groups with a replica write for each of the writes including a concurrency group identifier identifying the one of the concurrency groups to which the write was assigned, wherein the writes assigned to one of the it of concurrency groups are issued together before any are completed;
transferring the replica writes over a communication network to the remote data storage system;
processing the concurrency group identifiers of the transferred replica writes with a write order manager; and
with the write order manager, issuing a subset of the replica writes concurrently to a target volume on a second data storage resource in the remote data storage system based on the concurrency group identifiers.

2. The method of claim 1, wherein the received plurality of writes are issued concurrently by a host.

3. The method of claim 2, wherein the concurrently issued writes are issued together by the host before any are completed.

4. The method of claim 1, wherein the concurrency group identifiers each comprise a concurrency group number and wherein the subset of the replica writes includes ones of the replica writes with a single value for the concurrency group number.

5. The method of claim 4, wherein the operating of the write manager comprises assigning a first number for the concurrency group number to the replica writes in the subset and assigning a second number for the concurrency group number to the replica writes in a later subset after one or more of the replica writes in the subset completes in the first data storage resource.

6. The method of claim 1, wherein the concurrency group identifiers comprise a sequence number of a last one of the writes completed to the first data storage resource and wherein the subset of the replica writes includes ones of the replica writes that have a matching value for the sequence number of the last one of the writes completed.

7. The method of claim 6, wherein the operating of the write manager comprises assigning the sequence number of the last one of the writes completed until one of the writes with a greater sequence number completes and then involves assigning the greater sequence number as part of the concurrency group identifier for subsequence ones of the writes.

8. A data storage system implementing asynchronous replication with write order control for data backups, comprising:
a primary site comprising a server running an application that issues a plurality of writes, a storage controller running a write manager, a primary data storage resource, and an asynchronous log, wherein the write manager stamps each of the writes with a concurrency group identifier prior to storing the writes in the asynchronous log, and wherein writes stamped with the same concurrency group identifier are issued together by the application before any are completed; and
a secondary site linked to the primary site comprising memory for storing the writes along with the concurrency group identifiers, a secondary data storage resource with target volumes corresponding to application volumes on the local data storage resource, and a storage controller running a write order manager, wherein the write order manager concurrently issues a set of the writes stored in the memory based on the concurrency group identifiers.

9. The system of claim 8, wherein the writes in the set each have an equal value for the concurrency group identifier.

10. The system of claim 8, wherein the concurrency group identifier comprises a sequence number for the corresponding write and a concurrency group number.

11. The system of claim 10, wherein the concurrency group number is used by the write manager until at least one of the writes in a set of the writes completes at the local data storage resource after which the concurrency group number is incremented or decremented.

12. The system of claim 8, wherein the concurrency group identifier comprises a sequence number for the corresponding write and the sequence number of a last one of the writes to complete to the local data storage resource.

13. The system of claim 12, wherein the sequence number of the last one of the writes to complete is used in the concurrency group identifier by the write manager until one of the writes with a greater one of the sequence numbers completes to the local data storage resource and then the greater one is used as the concurrency group identifier.

* * * * *

UNITED STATES PATENT AND TRADEMARK OFFICE
CERTIFICATE OF CORRECTION

| | | |
|---|---|---|
| PATENT NO. | : 8,468,313 B2 | Page 1 of 1 |
| APPLICATION NO. | : 11/457633 | |
| DATED | : June 18, 2013 | |
| INVENTOR(S) | : Wai C. Yim and Charles Binford | |

It is certified that error appears in the above-identified patent and that said Letters Patent is hereby corrected as shown below:

Column 9, Lines 17-37, please replace Claim 1 with the following:

-- 1. A method for ordering writes in a remote data storage system such that the ordering of the writes is preserved in the remote data storage system, the method comprising:
receiving a plurality of writes to a volume in a first data storage resource;
operating a write manager to group each of the writes into one of a plurality of concurrency groups with a replica write for each of the writes including a concurrency group identifier identifying the one of the concurrency groups to which the write was assigned, wherein the writes assigned to one of the plurality of concurrency groups are issued together before any are completed;
transferring the replica writes over a communication network to the remote data storage system;
processing the concurrency group identifiers of the transferred replica writes with a write order manager; and
with the write order manager, issuing a subset of the replica writes concurrently to a target volume on a second data storage resource in the remote data storage system based on the concurrency group identifiers. --

Signed and Sealed this
Twenty-seventh Day of August, 2013

Teresa Stanek Rea
*Acting Director of the United States Patent and Trademark Office*